United States Patent
Salloum Salazar

(10) Patent No.: US 7,028,076 B2
(45) Date of Patent: Apr. 11, 2006

(54) SYSTEM OF APPARATUSES THAT COMMUNICATE VIA A BUS STRUCTURE

(75) Inventor: Antonio Elias Salloum Salazar, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 661 days.

(21) Appl. No.: 10/090,919

(22) Filed: Mar. 5, 2002

(65) Prior Publication Data

US 2002/0133632 A1    Sep. 19, 2002

(30) Foreign Application Priority Data

Mar. 9, 2001   (EP) .................................. 01200893

(51) Int. Cl.
*G06F 15/16* (2006.01)
(52) U.S. Cl. .................... 709/209; 253/238; 714/48; 370/431
(58) Field of Classification Search ................ 709/201, 709/253, 238, 209; 370/364, 402, 431; 379/269; 702/186; 714/48
See application file for complete search history.

(56) References Cited

U.S. PATENT DOCUMENTS

| | | | | |
|---|---|---|---|---|
| 5,835,498 A | * | 11/1998 | Kim et al. | 370/537 |
| 5,875,301 A | * | 2/1999 | Duckwall et al. | 710/8 |
| 5,963,202 A | * | 10/1999 | Polish | 715/723 |
| 6,038,600 A | * | 3/2000 | Faulk et al. | 709/224 |
| 6,763,369 B1 | * | 7/2004 | Ytuarte et al. | 709/201 |

FOREIGN PATENT DOCUMENTS

WO    WO 99 67760    *  6/1999

* cited by examiner

*Primary Examiner*—Kamini Shah

(57) ABSTRACT

Apparatuses are connected in a tree structure, wherein the branches correspond to bus connections between apparatuses. The apparatus at the root node the tree ultimately arbitrates access to the bus connections. The tree structure is dynamically reorganized by selecting a new root node. Selection of the new root node involves predicting a volume of messages to be sent by each of the apparatuses (preferably by counting the number of messages originating from each apparatus during an observation period). An expected heavy sender apparatus is selected as new root node. Thus, the heavy sender is able to get faster access to arbitration and network resources, reducing jitter in the time points at which messages can be sent by the heavy sender.

9 Claims, 2 Drawing Sheets

SYSTEM OF APPARATUSES THAT COMMUNICATE VIA A BUS STRUCTURE

The invention relates to a system of apparatuses that communicate via a communication bus.

U.S. Pat. No. 5,784,557 describes a system of apparatuses such as a P1394 bus system in which communication is performed via a tree structure of connections that forms a bus. This tree structure has nodes corresponding to apparatuses and branches between nodes, the branches corresponding to connections between the apparatuses. One of the apparatuses corresponds to a root node, from this root node, branches run to child nodes. The root node is said to be the parent node of these child nodes. From these child nodes other branches run to further child nodes (the child nodes being called parent nodes of the further child nodes) and so on until one reaches the leaves of the tree.

Communication between apparatuses occurs via the connections. Communication occurs fixed duration cycles of packets. A cycle starts once the root node has transmitted a cycle start packet. During the cycle any apparatus is allowed to send packets of information to other apparatuses. If two apparatuses are connected directly, communication occurs via the direct connection. If two apparatuses are not connected directly, communication occurs via intermediate apparatuses.

If more than one apparatus requests to communicate via the tree structure at the same time, arbitration is needed to decide which of the apparatuses will be allowed to communicate first. In the P1394 bus arbitration is ultimately resolved by the apparatus corresponding to the root node. Any apparatus that needs to communicate sends a request for communication to its parent, which passes the request to its parent and so on until the request reaches the root node. If a parent receives a request from one of its children for transmitting a packet when the parent has already passed another request for transmitting that packet, either from another child or from the parent itself, the parent denies the later request. If requests arrive at the same time, the parent arbitrates between the various requests and passes on the request from the winner. The root node grants the first arriving request or a request of its own or arbitrates if necessary. Thus, arbitration is fully decided once the root node has arbitrated between incoming requests.

In the P1394 bus audio/video information can be passed from one apparatus to another, such as image display devices that displays the information "live" to the user. The real-time requirements involved with this are met reserving a predetermined part of the fixed duration of the communication cycle (the so-called isochronous packets) for this real-time information. An isochronous resource manager apparatus manages authorization to make use of this part of the cycle, for example by assigning channel numbers and bandwidth. Any apparatus that needs real-time information communication capacity requests this capacity from the isochronous resource manager in terms of a number of isochronous packets in each communication cycle. The isochronous resource manager grants these requests only as long as a sum total of the granted requests does not exceed the amount of channels and bandwidth available in the predetermined part of the cycle for the isochronous packets. When an apparatus requests so many channels or bandwidth that the sum total would exceed this part, the request is not granted and the apparatus cannot start communicating.

Thus, it is ensured that a real-time apparatus that has been allowed to transmit audio/video information can always win arbitration for its requested number of isochronous packets in a communication cycle. No other apparatus will cause this real-time apparatus to be "starved" by defeating the real-time apparatus in arbitration for too many isochronous packets. It should be noted that when an apparatus has requested capacity for a certain amount channels or bandwidth corresponding to a certain number of isochronous packets, this means only that the apparatus will send this amount at maximum. It does not mean that the maximum is reached in each communication cycle: e.g. in MPEG video, the actual amount of information transmitted depends on the video content.

U.S. Pat. No. 5,784,557 mentions the possibility of selecting the root node dynamically (during run time) to optimize a given system, but it gives no details on the criteria for selecting the root node.

Amongst others, it is an object of the invention to provide for a mechanism to improve the quality of communication and/or to reduce the resources needed to provide sufficient quality of communication in such a bus system.

The invention provides for a system of apparatuses with a communication bus, the system comprising at least two apparatuses, each comprising a circuit for transmitting messages;

a plurality of bus connections, each connected between a respective pair of apparatuses;

the apparatuses comprising circuits for organizing the system into a tree communication structure, in which a first one of the apparatuses is a root node and remaining apparatuses are subordinate nodes, communicating with the root node via the bus connections directly or via other subordinate nodes, the root node and the subordinate being allowed to arbitrate for access to the communication structure, the root node ultimately resolving arbitration;

wherein the apparatuses are arranged to dynamically assign a second one of the apparatus to be root node;

and wherein at least one of the apparatuses is arranged to select the second one of the apparatuses to become root node on the basis of detection that a third one of the apparatuses, which may be the second one of the apparatuses, is expected to need relatively more access to the communication structure than other apparatuses, the second one of the apparatuses being selected closer to the third one of the apparatuses than the first one of the apparatuses, in terms of a number of connections needed to communicate from the first and second one of the apparatuses to the third one of the apparatuses.

The effect of locating an apparatus that is a relatively heavy user of the communication structure closer to the root node, and preferably at the root node, is that this apparatus will more quickly be granted the right to transmit a packet and that it will have quicker access to network resources. There will be less jitter in the time points of transmission of packets from the heavy user litter occurs when these time points vary more or less randomly because arbitration is won by unpredictable requests from other apparatuses). The effect of this jitter on audio/video information can be eliminated by buffering the information for a period equal to the maximum amount of jitter, but by locating an audio/video source apparatus closer to the root node the isochronous jitter is reduced with less buffer memory usage. When the heavy user is closer to the root node less time is also lost to get requests to the root node, so that timing for communication is relaxed. These advantages are maximized when the heavy user is located at the root node.

In an embodiment of the system according to the invention, one of the apparatuses counts the number of packets that are transmitted by the various apparatuses that are connected to the communication structure. The counts are used to select an apparatus that is a relatively heavy user, preferably the heaviest user over a counting period. The root node is then moved closer to the selected apparatus. Preferably, the selected apparatus is made root node. Alternatively, the relatively heavy user may be selected on the basis of the size of the requests made to the isochronous resource manager. However, this may have the undesirable effect that too much overhead is incurred to move the root node to an apparatus that has a relatively short lived request, or an apparatus that uses fewer packets than actually requested from the isochronous resource manager. By counting the actual number of packets transmitted over a period of time a more effective selection of the root node can be made.

These and other advantageous aspects of the system, method and apparatus according to the invention will be discussed in more detail using the following figures.

Figure 1:
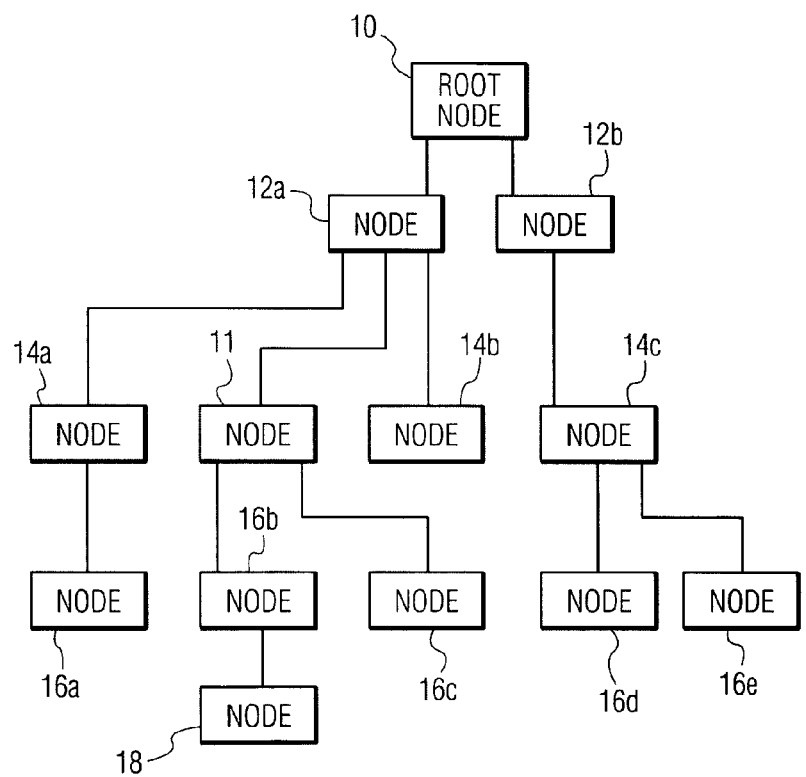
FIG. 1 shows a first communication tree structure

FIG. 1 shows a first communication tree structure used in a P1394 bus. The figure shows a number of apparatuses 10, 11, 12a,b, 14a–c, 16a–e, 18 connected to each other in a tree structure. The connections represent communication channels between the apparatuses. One of the apparatuses 10 is a root node of the tree structure and is the parent node of apparatuses 12a,b that correspond to two child nodes of this parent. These child nodes are in turn parent nodes of further child nodes that correspond to apparatuses 11, 14a–c.

Further apparatuses 16a–e, 18 are successively further removed from the apparatus 10 at the root node. In FIG. 1 any apparatus that is shown higher than another apparatus connected to it is the parent of that other apparatus, and the other apparatus the child of the parent.

In a P1394 bus system, each apparatus 10, 11, 12a,b, 14a–c, 16a–e, 18 typically has a circuit (not shown) for transmitting message packets to its neighbors in the tree structure via the connections, a circuit (not shown) for receiving message packets from its neighbors and a circuit (not shown) for passing message packets from one of its neighbors to another via the connections. Furthermore, each apparatus 10, 11, 12a,b, 14a–c, 16a–e, 18 typically has a circuit (not shown) for sending a request to send a message packet via the connections to one of its neighbors that acts as its parent. At least the apparatuses that act as parent to a child node also have a circuit (not shown) for passing on such request to their own parent via the connections, an arbitration circuit (not shown) to select which request to pass on in case more than one request arrives at the same time and a circuit (not shown) to return an denial or grant of the request to the requesting child via the connections (the grant being passed on as received from the root node 10 via a parent, the denial being either passed on or generated in the apparatus that returns the denial).

In operation the apparatuses 10, 11, 12a,b, 14a–c, 16a–e, 18 communicate with one another via the communication channels represented by the connections between the apparatuses 10, 11, 12a,b, 14a–c, 16a–e, 18. If two apparatuses 10, 11, 12a,b, 14a–c, 16a–e, 18 are not connected directly, they communicate via other apparatuses. For example, if a sending apparatus 11 communicates with a receiving apparatus 16d, communication will travel through intermediate apparatuses 12a, 10, 12b, 14c.

When an apparatus 10, 11, 12a,b, 14a–c, 16a–e, 18 needs to send a packet, it sends a request to its parent. The parent decides whether or not to pass on the request to its parent, depending on whether the parent has already passed on from another child or a request of its own. If the request is not passed on the parent returns a denial to its child. Ultimately, a request reaches the apparatus at the root node 10, which returns a signal indicating whether the request has been granted or denied. This signal is passed back via the tree structure to the apparatus that originated the request. Thereupon this apparatus starts sending the message packet.

For example, if the sending apparatus 11 wants to send a message packet, sending apparatus 11 sends a request to the apparatus 12a at its parent node. This apparatus 12a passes on the request to the apparatus 10 at the root node. The apparatus at the root node 10 returns a grant signal to the apparatus 12a at the parent node, which passes this signal back to the sending apparatus 11.

Thus, the apparatus 10 at the root node is the ultimate authority on grant of requests to send packets. In order to be granted requests must always travel to the apparatus 10 at the root node and back.

Another function performed the apparatus 10 at the root node is that the apparatus 10 transmit a cycle start packet that indicates the start of a cycle, with a predetermined duration of for example 125 microseconds of packets. A predetermined fraction of each cycle of packets is allocated with priority for so-called isochronous packets. Isochronous packets are packets that have to be sent within a predetermined time period, more particularly within the duration of a cycle of packets. This is necessary for transmitting real-time information, for example audio or video data which has to be output by one of the apparatuses at predetermined time-points in order to ensure uninterrupted viewing or listening. The system controls the number of apparatuses that are allowed to send such isochronous packets, so that transmission of no more isochronous packets will be requested than can be sent in the fraction of the cycle that is allocated for isochronous packets.

One of the apparatuses 10, 11, 12a,b, 14a–c, 16a–e, 18 performs the function of an isochronous resource manager that selects which of the apparatuses 10, 11, 12a,b, 14a–c, 16a–e, 18 are allowed to transmit isochronous packets. Each apparatus 10, 11, 12a,b, 14a–c, 16a–e, 18 that wants to transmits such packets has to send a message to this effect to the isochronous resource manager apparatus, specifying a required number of channels and/or bandwidth. Similarly the apparatuses 10, 11, 12a,b, 14a–c, 16a–e, 18 notify the isochronous resource manager of the end of their need to transmit isochronous packets or of any change in number of channels and/or bandwidth needed per communication cycle. The isochronous resource manager accepts these requests and enables the requesting apparatuses 10, 11, 12a,b, 14a–c, 16a–e, 18 to send isochronous packets up to the point that a request would cause the total number of requested number of packets to exceed the available fraction of the cycle of communication. In that case the bus manger will deny the request and the requesting apparatus 10, 11, 12a,b, 14a–c, 16a–e, 18 will not be able to send isochronous packets. The isochronous resource manager function may be performed by any apparatus 10, 11, 12a,b, 14a–c, 16a–e, 18 in the system (provided the apparatus contains the necessary circuits).

The P1394 system has a liberty to select which of the apparatuses 10, 11, 12a,b, 14a–c, 16a–e, 18 will correspond to the root node when the apparatuses have a given set of connections. A process with this purpose is described in U.S.

Pat. No. 5,784,557. The system executes a stage of definition of the tree structure in which it is established for every apparatus which of its connections to other apparatuses correspond to connections to child nodes and which of its connections correspond to the parent node. One of the apparatus has no parent node. This is the root node.

In principle any apparatus 10, 11, 12a,b, 14a–c, 16a–e, 18 could function as root node (provided the apparatus contains the necessary circuits, but most P1394 enabled apparatuses contain these circuits). The definition stage that includes selection of the root node occurs when the system is started up, but the P1394 bus also allows for dynamic redefinition of the root node.

Figure 2:
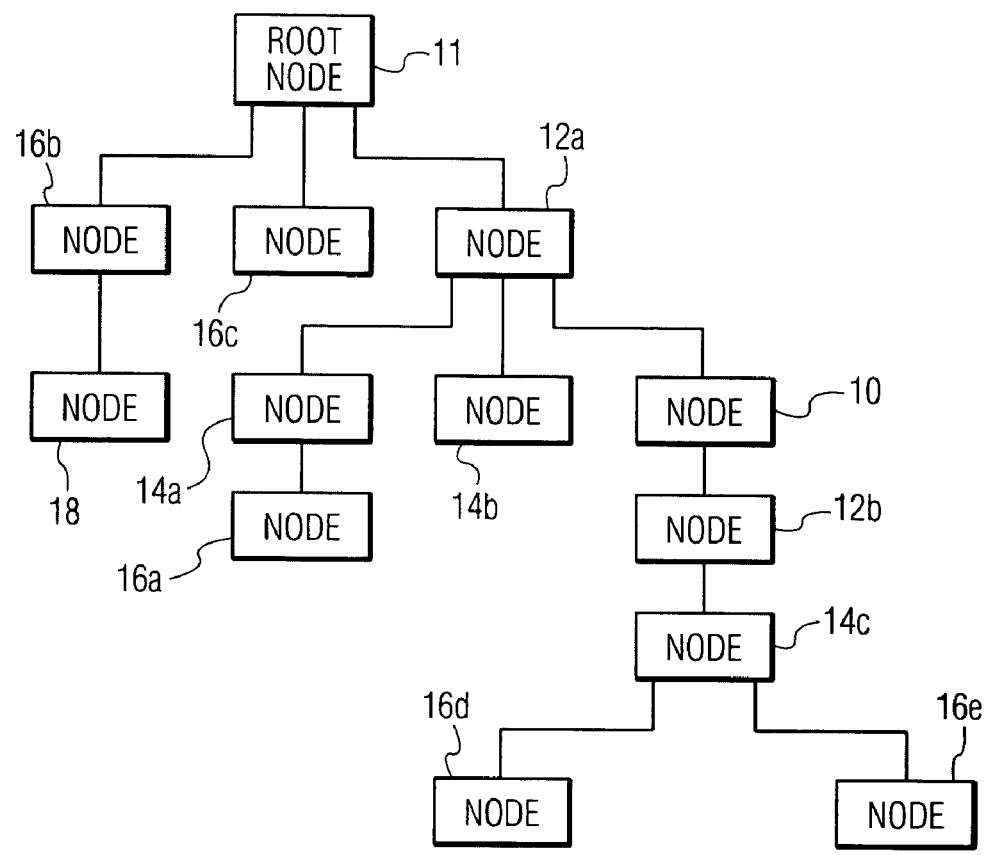
FIG. 2 shows a reorganized communication tree structure

After a redefinition, the communication structure of the system with the connections of FIG. 1 may be converted for example to the structure shown in FIG. 2. FIG. 2 shows the same apparatuses 10, 11, 12a,b, 14a–c, 16a–e, 18 as FIG. 1, with the same reference numerals and the same connections. As in FIG. 1, any apparatus in FIG. 2 that is shown higher than another apparatus connected to it is the parent of that other apparatus, and the other apparatus the child of the parent.

In FIG. 2 another apparatus 11 has been made root node, i.e. has been made the ultimate authority on grant of requests to send packets. This new root node is shown at the top of the tree structure in FIG. 2.

According to the invention, the system controls the selection of the apparatus that serves as root node. The system changes the root node dependent on the expected amount of packets from the apparatuses. Preferably, a heaviest sending apparatus that is expected to send the most isochronous packets, or the most packets in general, is made root node, or at least an apparatus closer to this heaviest sending apparatus than the previous root node is made root node (for example if the heaviest sending apparatus is itself not capable of operating as root node).

Preferably the root node is located at, or as closely as possible to the apparatus that is expected to send the most isochronous packets rather than apparatus that is expected to send the most packets in general. Jitter in the delivery of isochronous packets affects the quality of service of the system. This jitter is reduced by placing the root node at or as close as possible to the apparatus that is expected to send the most isochronous packets. Jitter in non-isochronous packets does not (or to a much smaller extent) affect the quality of service. Therefore, to optimize observable quality of service the expected number of isochronous packets is preferably used to select the root node. However, as a less accurate alternative, a count of the total number of packets (isochronous or not) may be used.

The heaviest sending apparatus 10, 11, 12a,b, 14a–c, 16a–e, 18 can be detected for example from the requests for permission to send isochronous packets as they are made to the isochronous resource manager. However, it should be avoided that the root node is changed each time immediately when an apparatus 10, 11, 12a,b, 14a–c, 16a–e, 18 requests permission to send a lot of isochronous packets. Therefore, in one embodiment, the root node is moved closer to an apparatus 10, 11, 12a,b, 14a–c, 16a–e, 18 that has requested permission to send most isochronous packets only when this apparatus 10, 11, 12a,b, 14a–c, 16a–e, 18 has been transmitting under this permission for a predetermined time, for example 1 second, or 10 seconds or a minute or more.

However, allocation of capacity for sending isochronous packets can be quite dynamic, so that isochronous capacity allocated in response to a specific request is allocated only for a brief period. Furthermore, the requests do not necessarily reflect the actual number of isochronous packets. As a result it has been found that selection of the root node on the basis of the requests is often unsatisfactory.

In another embodiment the heaviest sending apparatus 10, 11, 12a,b, 14a–c, 16a–e, 18 is selected by observing which apparatus sends the highest number of isochronous packets via the tree structure for a predetermined period of time. Thus, the aggregate number of packets is counted for each apparatus over a period that is longer than the time that an average request for isochronous capacity remains valid.

The count of the number of isochronous packets sent by respective ones of the apparatuses 10, 11, 12a,b, 14a–c, 16a–e, 18 is accumulated by one of the apparatuses 10, 11, 12a,b, 14a–c, 16a–e, 18 (the observer apparatus) that is programmed for this purpose. The observer apparatus may be for example the isochronous resource manager apparatus or the apparatus 11 at the root node, or any other apparatus 10, 11, 12a,b, 14a–c, 16a–e, 18. The observer apparatus detects the isochronous packets passing via the bus.

In the P1394 bus, the isochronous resource manager allocates transmission capacity on the basis of channels rather than on the basis of apparatuses. Each isochronous packet contains the channel number to which the isochronous packet belongs, but no identification of the apparatus that has sent the isochronous packet. At any one time each channel number corresponds to one sending apparatus and different channel numbers may correspond to the same apparatus. The correspondence between channel numbers and apparatuses may change over time.

Figure 3:
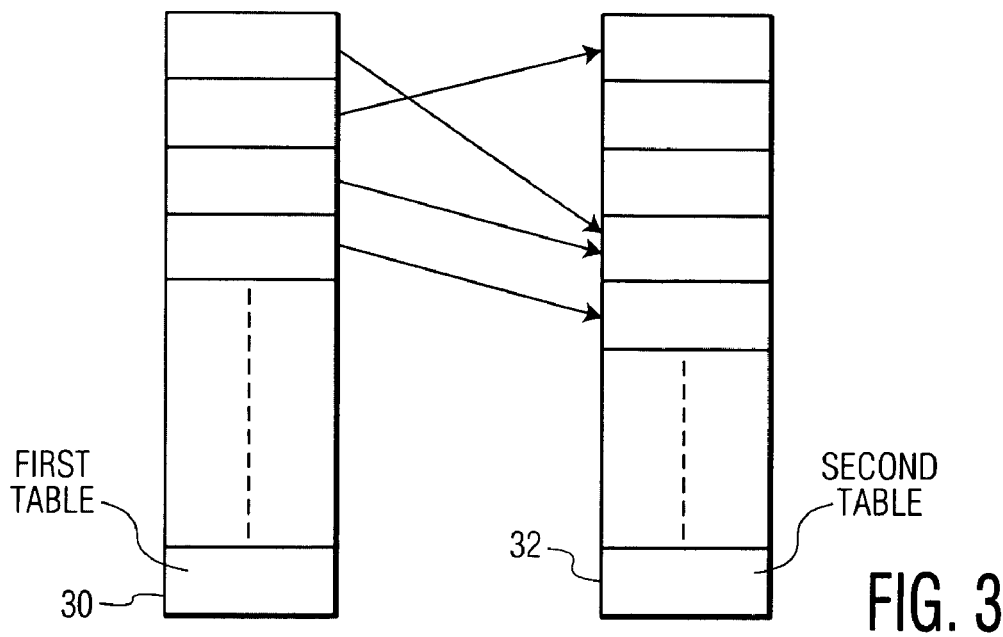
FIG. 3 shows a data-structure for counting bus traffic

FIG. 3 shows a data structure for use by the observer apparatus. This data structure contains a first table 30 which is addressed by isochronous channel numbers. The first table 30 contains pointers to entries in a second table 32. The second table 32 contains count values for different apparatuses. By way of example, the first table 30 contains 64 entries, addressed by 6 bit channel numbers. Also by way of example, the second table 32 contains 64 entries for a apparatuses in a tree structure. In P1394 16 bit node ID's are used, to allow for multiple tree structures, but the count values are preferably determined local to a tree structure and 64 apparatus is possible in a tree structure, the second table 32 being addressed by the 6 least significant bits of the node ID.

In operation, the observer apparatus detects when the isochronous resource manager (which is preferably the same apparatus as the observer apparatus) assigns a channel number. The observer apparatus determines the apparatus number of the apparatus that acts as source of the isochronous packets for the channel and writes that apparatus number into the first table 30 in the entry addressed by the channel number.

At the start of an observation period the observer apparatus initializes the count values in all entries of the second table 32 to zero. During the observation period the observer apparatus detects each isochronous packet that is transmitted via the communication structure. On detecting a particular isochronous packet the observer apparatus reads the channel number from that isochronous packet and accesses the first table 30 at the entry pointed at by the channel number. This entry in the first table points at a particular entry in the second table 32. Subsequently, the observer apparatus increments the count value in this particular entry of the second table 32.

At the end of the observation period the count values in the entries of the second table 32 represent the intensities with which the various apparatuses send isochronous packets via the communication structure. It is determined which entry contains the highest count value. The communication structure is reconfigured to make the apparatus that corresponds to this entry root node of the communication structure.

Of course, alternative ways of computing the count values may be used. For example, as an alternative, the observer apparatus could count the number of isochronous packets transmitted per channel number, reset the count value when the channel number is reassigned to another apparatus, adding the count value accumulated before the reset to a count value for the apparatus to which the channel number was previously assigned. Also at the end of the observation period the current count values for the various channel number are added to the count values of the apparatuses to which the channels are then assigned. In this alternative the number of operations per isochronous packet is reduced (no need to reference the count value indirectly). However, the alternative requires more storage space for count values.

What is claimed is:

1. A system of apparatuses with a communication bus, the system comprising:
    at least two apparatuses, each comprising a circuit for transmitting messages;
    a plurality of bus connections, each connected between a respective pair of apparatuses;
    the apparatuses comprising circuits for organizing the system into a tree communication structure, in which a first one of the apparatuses is a root node and remaining apparatuses are subordinate nodes, communicating with the root node via the bus connections directly or via other subordinate nodes, the root node and the subordinate being allowed to arbitrate for access to the communication structure, the root node ultimately resolving arbitration;
    wherein the apparatuses are arranged to dynamically assign a second one of the apparatus to be root node; and
    wherein at least one of the apparatuses is arranged to select the second one of the apparatuses to become root node on the basis of detection that an apparatus other than the root node is expected to need relatively more access to the communication structure than other apparatuses, the second one of the apparatuses being selected closer to the apparatus needing relatively more access to the communication structure than the first one of the apparatuses, in terms of a number of connections needed to communicate from the first and second one of the apparatuses to the apparatus needing relatively more access to the communication structure.

2. A system according to claim 1, wherein at least one apparatus is arranged to accumulate counts of an amount of communication traffic originating from respective ones of the apparatuses, the apparatus needing relatively more access to the communication structure being selected on the basis of having a highest of the counts.

3. A system according to claim 1, wherein the apparatuses are arranged to select the apparatus needing relatively more access to the communication structure as the second one of the apparatuses.

4. A system according to claim 1, wherein the system operates in fixed duration cycles of messages, a predetermined fraction of the cycle being allocated to isochronous messages, the apparatuses being enabled to send no more isochronous messages per cycle than can be sent in the predetermined fraction of the cycle, the apparatus needing relatively more access to the communication structure being selected on the basis of detection that the apparatus needing relatively more access to the communication structure is expected to send relatively more isochronous messages than other apparatuses.

5. A system according to claim 4, wherein at least one apparatus is arranged to accumulate counts of a number of isochronous messages originating from respective ones of the apparatuses, the apparatus needing relatively more access to the communication structure being selected on the basis of having a highest of the counts.

6. An apparatus for use in a communication system having apparatuses and bus connections each connected between a respective pair of apparatuses, the apparatus being adapted to:
    communicate a tree structure with nodes corresponding to the apparatuses, including a root node apparatus;
    count an amount of communication traffic originating from respective ones of the apparatuses;
    select an apparatus originating a greater amount of communication traffic; and
    initiate a redefinition of the root node apparatus of the tree structure to an new root node apparatus closer to the apparatus originating a greater amount of communication traffic.

7. An apparatus according to claim 6, wherein the apparatus comprises:
    a first table;
    and a second table,
    the first table having entries for pointers to entries in the second table, the entries of the first table being addressed by channel numbers, the entries in the second table being for count values for respective apparatuses, the apparatus being adapted to
    detect assignments of apparatuses as sources for channel numbers;
    change a first one of the entries for a first one of the channel numbers in the first table, when it is detected that a first one of the apparatuses is assigned to the first one of the channel numbers, storing a pointer to the first one of the apparatuses in the first one of the entries;
    detect a packet with a transmitted one of the channel numbers sent via a communication structure;
    read a first one of the pointers addressed by the transmitted one of the channel numbers from the first table; and
    update a count in an entry in the second table pointed at by the first one of the pointers.

8. A method of communicating information in a system of apparatuses with a communication bus, wherein the system comprises bus connections between pairs of apparatuses, the apparatuses each comprising a circuit for transmitting messages, the apparatuses comprising circuits for organizing the system into a tree comniunication structure, in which a first one of the apparatuses is a root node and remaining apparatuses are subordinate nodes, communicating with the root node via the bus connections directly or via other subordinate nodes, the root node and the subordinate being allowed to arbitrate for access to the communication structure, the root node ultimately resolving arbitration; the method comprising
    predicting a volume of messages to be sent by each of the apparatuses;
    selecting an apparatus expected to need relatively more access to the communication structure than other apparatuses; and
    dynamically selecting a new root apparatus to become root node, the new root apparatus being selected closer to the apparatus expected to need relatively more access to the communication structure than the apparatus previously corresponding to the root node, in terms of a number of connections needed to communicate from the new and previous root node to the apparatus expected to need relatively more access to the communication structure.

9. The method of claim 8, wherein the apparatus expected to need relatively more access to the communication struture is selected as the new root apparatus.

* * * * *